(12) United States Patent
Kojima et al.

(10) Patent No.: US 8,538,165 B2
(45) Date of Patent: Sep. 17, 2013

(54) IMAGE MEASURING APPARATUS, PROGRAM, AND TEACHING METHOD OF IMAGE MEASURING APPARATUS

(75) Inventors: Tsukasa Kojima, Sapporo (JP); Kozo Ariga, Tokyo (JP); Jyota Miyakura, Chiba (JP)

(73) Assignee: Mitutoyo Corporation, Kanagawa (JP)

( * ) Notice: Subject to any disclaimer, the term of this patent is extended or adjusted under 35 U.S.C. 154(b) by 279 days.

(21) Appl. No.: 13/091,350

(22) Filed: Apr. 21, 2011

(65) Prior Publication Data

US 2011/0280496 A1 Nov. 17, 2011

(30) Foreign Application Priority Data

May 11, 2010 (JP) ................................ 2010-108946

(51) Int. Cl.
*G06K 9/48* (2006.01)
(52) U.S. Cl.
USPC ........... 382/199; 382/145; 382/146; 382/147; 382/148; 382/149; 382/150; 382/151; 382/203
(58) Field of Classification Search
USPC .......................... 382/145, 147, 149, 199, 203
See application file for complete search history.

(56) References Cited

U.S. PATENT DOCUMENTS

| | | | |
|---|---|---|---|
| 5,995,663 A | 11/1999 | Itsuzaki et al. | |
| 6,600,808 B2 | 7/2003 | Takada et al. | |
| 6,621,928 B1 | 9/2003 | Inagaki et al. | |
| 6,968,080 B2 | 11/2005 | Takada et al. | |
| 7,167,583 B1 * | 1/2007 | Lipson et al. | 382/147 |
| 2006/0200332 A1 * | 9/2006 | Ishimoto et al. | 703/13 |
| 2008/0089589 A1 | 4/2008 | Lettenbauer et al. | |
| 2009/0034833 A1 * | 2/2009 | Ozaki et al. | 382/149 |

FOREIGN PATENT DOCUMENTS

JP 8-247719 9/1996

OTHER PUBLICATIONS

Search report from E.P.O., mail date is Aug. 24, 2011.

* cited by examiner

*Primary Examiner* — Ruiping Li
(74) *Attorney, Agent, or Firm* — Greenblum & Bernstein, P.L.C.

(57) ABSTRACT

A data memory storing Gerber data containing closed area information of a work; a display displaying a pattern image based on the closed area information of the Gerber data; a detection specification information display program displaying on the display a detection tool specifying a location of edge to be detected, a detection direction and detection length, by superimposing on the pattern image; an image capturing program and an image capturer capturing an image of an area corresponding to the detection tool of the work; an edge detection program performing an edge detection of the location of the edge to be detected with respect to data of a captured image; and a condition determination program determining a light-dark change condition indicating whether an image is changing from a light section to a dark section or from a dark section to a light section along a detection direction.

5 Claims, 12 Drawing Sheets

Image Data (low resolution)

Image Data (high resolution)

Image Data and Tool (low resolution)

Image Data and Tool (high resolution)

IMAGE MEASURING APPARATUS, PROGRAM, AND TEACHING METHOD OF IMAGE MEASURING APPARATUS

CROSS-REFERENCE TO RELATED APPLICATIONS

The present application claims priority under 35 U.S.C. §119 of Japanese Application No. 2010-108946, filed on May 11, 2010, the disclosure of which is expressly incorporated by reference herein in its entirety.

BACKGROUND OF THE INVENTION

1. Field of the Invention

The present invention relates to an image measuring apparatus, a program, and a teaching method of the image measuring apparatus.

2. Description of Related Art

Conventionally, an image measuring apparatus is known which captures an image of a work by using a CCD (Charge Coupled Device) camera and the like, detects an edge contained in the image of the work, and, based on the detected edge, measures necessary measurement information (dimension of the work and the like) (for example, see Japanese Patent Laid-Open Publication No. H8-247719). This image measuring apparatus, for example, is used to measure a wiring pattern and the like for which a contact measurement is difficult. When performing a measurement, after a work is set on a measurement table, an image capturer, such as a CCD camera, is moved to a place of the work where a measurement is desired, and a focus adjustment is performed to display an enlarged image of the work on a display. And, with respect to the displayed enlarged image, a so-called edge teaching operation, in which conditions such as a location of an edge to be detected, a detection direction and a detection length are specified, is performed by using a mouse cursor. Thereby, an edge portion of the image is extracted, and desired measurement values are obtained by an arithmetic processing.

In such an edge teaching operation of an image measuring apparatus, when a "light-dark change of a detection direction", which is one of edge detection parameters, is set, certainty of the edge detection can be increased. Here, the "light-dark change of a detection direction" is a condition indicating whether an image is changing from a light section to a dark section or from a dark section to a light section along the detection direction. However, conventionally, the setting of the "light-dark change of a detection direction" was performed by a user based on a self-judgment. Therefore, there was a problem that workability and efficiency of the teaching operation were poor.

SUMMARY OF THE INVENTION

A non-limiting feature of the present disclosure is to provide an image measuring apparatus, a program and a teaching method of the image measuring apparatus that improve workability and efficiency of a teaching operation in an edge detection process.

One aspect of the present disclosure is an image measuring apparatus, which includes a data memory storing Gerber data containing closed area information of a measured object; a display displaying a pattern image based on the closed area information of the Gerber data; a detection specification information displayer displaying, on the display, detection specification information specifying a location of an edge to be detected, a detection direction and a detection length, by superimposing on the pattern image displayed on the display; an image capturer capturing an image of an area corresponding to the detection specification information of the measured object, when the detection specification information is displayed on the display by the detection specification information displayer, by superimposing on the pattern image; an edge detector performing an edge detection of the location of the edge to be detected, with respect to data of an image captured by the image capturer, according to the detection direction and the detection length specified by the detection specification information; and a condition determiner determining, by using the Gerber data, a light-dark change condition indicating whether an image is changing from a light section to a dark section or from a dark section to a light section along the detection direction, when performing an edge detection by the edge detector.

According to another aspect of the present disclosure, the image measuring apparatus includes a graphic data preparer preparing, from the Gerber data, one graphic data or a plurality of graphic data, indicating a closed area of the pattern image; a searcher searching, from among the graphic data prepared by the graphic data preparer, a graphic having an intersection point with the detection specification information; a judge section judging whether a graphic having an intersection point with the detection specification information is found by the searcher; and a detection direction decider, when it is judged by the judge section that a graphic having an intersection point with the detection specification information is found, deciding whether the detection direction of the detection specification information is toward inside or outside with respect to the graphic, based on an angle formed by a vector toward a center of gravity of the graphic from the location of the edge to be detected and a vector of the detection direction of the detection specification information. In the image measuring apparatus, according to a result of deciding by the detection direction decider, the condition determiner determines the light-dark change condition as that the image changes from a light section to a dark section when the detection direction of the detection specification information is toward inside with respect to the graphic, and determines the light-dark change condition as that the image changes from a dark section to a light section when the detection direction of the detection specification information is toward outside with respect to the graphic.

According to another aspect of the present disclosure, the image measuring apparatus includes a resolution setter setting a resolution of digitized image data of the pattern image; an image data preparer preparing the image data of the pattern image with the resolution set by the resolution setter; a light-dark value acquirer acquiring light-dark values of pixels located at a starting point and an ending point of the detection specification information in the image data prepared by the image data preparer; and a judge section judging whether the light-dark values of the pixels acquired by the light-dark value acquirer are different. In the image measuring apparatus, the condition determiner, in a case where it is judged by the judge section that the light-dark values of the pixels are different, determines the light-dark change condition as that the image changes from a light section to a dark section when the starting point is brighter than the ending point, and determines the light-dark change condition as that the image changes from a dark section to a light section when the starting point is darker than the ending point.

Another aspect of the present disclosure is a program for causing a computer to perform as a data displayer displaying, on a display, a pattern image, based on closed area information of Gerber data of a measured object stored in a data memory; a detection specification information displayer displaying, on the display, detection specification information specifying a location of an edge to be detected, a detection direction and a detection length, by superimposing on the pattern image displayed on the display; an image capturer capturing an image of an area corresponding to the detection specification information of the measured object, when the detection specification information is displayed on the display by the detection specification information displayer, by superimposing on the pattern image; an edge detector performing an edge detection of the location of the edge to be detected, with respect to data of an image captured by the image capturer, according to the detection direction and the detection length specified by the detection specification information; and a condition determiner determining, by using the Gerber data, a light-dark change condition indicating whether an image is changing from a light section to a dark section or from a dark section to a light section along the detection direction, when an edge detection is performed by the edge detector.

Another aspect of the present disclosure is a teaching method of an image measuring apparatus, which includes a storage process storing, in a data memory, Gerber data containing closed area information of a measured object; a display process displaying, on a display, a pattern image based on the closed area information of the Gerber data; a detection specification information display process displaying, on the display, detection specification information specifying a location of an edge to be detected, a detection direction and a detection length, by superimposing on the pattern image displayed on the display; an image capture process capturing an image of an area corresponding to the detection specification information of the measured object, when the detection specification information is displayed on the display by the detection specification information display process, by superimposing on the pattern image; an edge detection process performing an edge detection of the location of the edge to be detected, with respect to data of an image captured by the image capture process, according to the detection direction and the detection length specified by the detection specification information; and a condition determination process determining, by using the Gerber data, a light-dark change condition indicating whether an image is changing from a light section to a dark section or from a dark section to a light section along the detection direction, when an edge detection is performed by the edge detection process.

According to the present disclosure, when performing an edge detection, a light-dark change condition, indicating whether an image is changing from a light section to a dark section or from a dark section to a light section along a detection direction, is automatically determined by using Gerber data. For this reason, a user is not required to consider a light-dark change condition with respect to a location of an edge to be detected. Therefore, workload of a teaching work is reduced, working time is shortened, and usability is improved. Further, the light-dark change condition is automatically determined. Therefore, setting mistakes are prevented, and reliability of a measurement is improved.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 11($b$) is an example illustrating digitized image data of a pattern image of a high resolution;

FIG. 12($b$) is an example illustrating the image data of a high resolution of FIG. 11($b$) and a detection tool.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

First Embodiment

In the following, with reference to the drawings, an image measuring apparatus 100 according to the present invention is explained in detail. The image measuring apparatus 100 is an apparatus which captures, by using a CCD camera and the like, an image of a work (measured object) placed on a movable stage, processes the image to detect a predetermined edge, and thereby measures a desired value of line width and the like. Specifically, for example, in order to judge whether a work such as a printed-circuit board is fabricated according to a specified pattern, the image measuring apparatus 100 captures an image of the work, and, when a user specifies an arbitrary location (location of an edge to be detected) with respect to the image, detects the edge at the location and measures coordinates of the edge.

Figure 1:
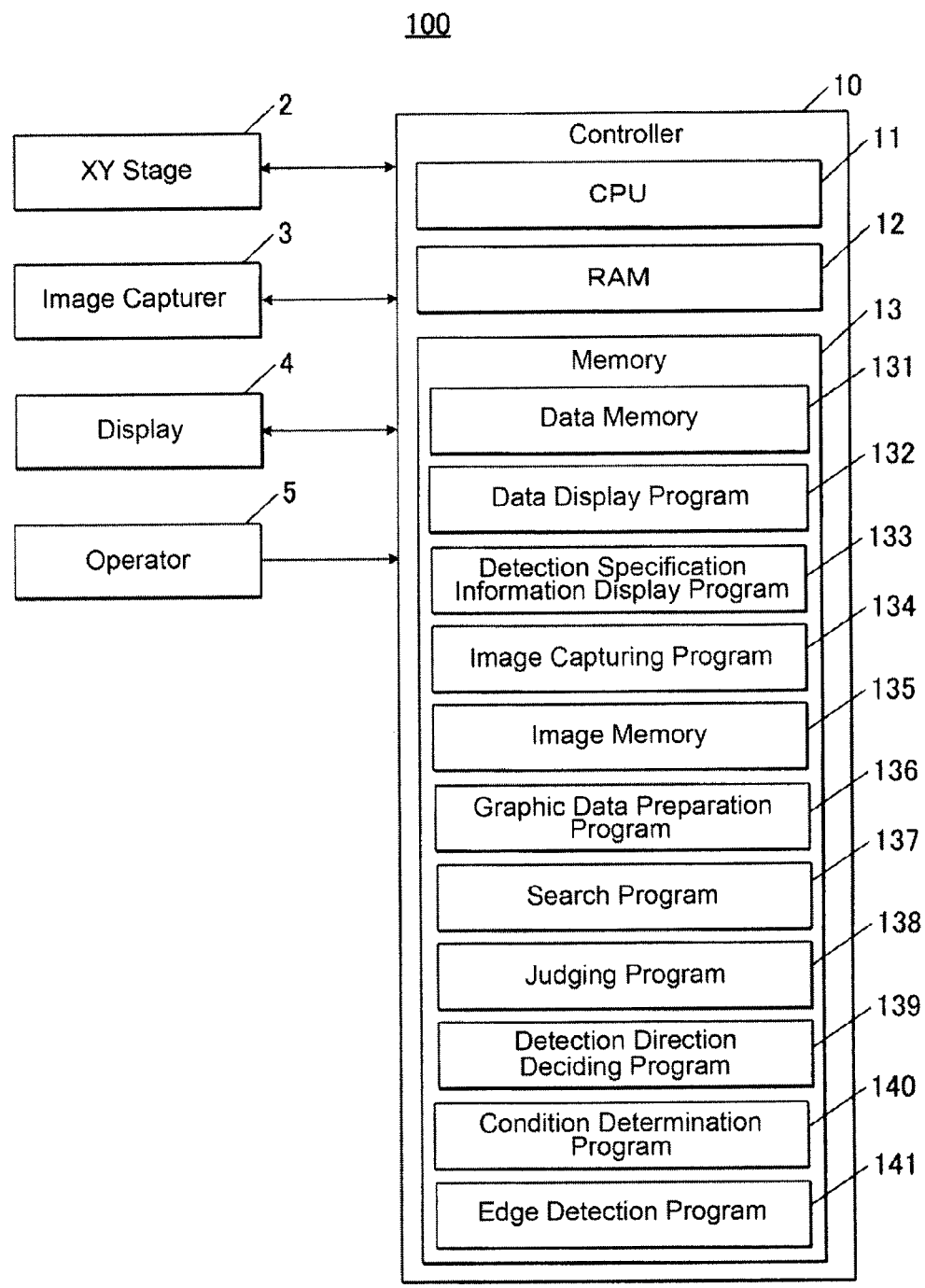
FIG. 1 is a block diagram illustrating an overall configuration of an image measuring apparatus of a first embodiment.

As illustrated in FIG. 1, the image measuring apparatus 100 includes an XY stage 2, an image capturer 3, a display 4, an operator 5, a controller 10, and the like.

Figure 2:
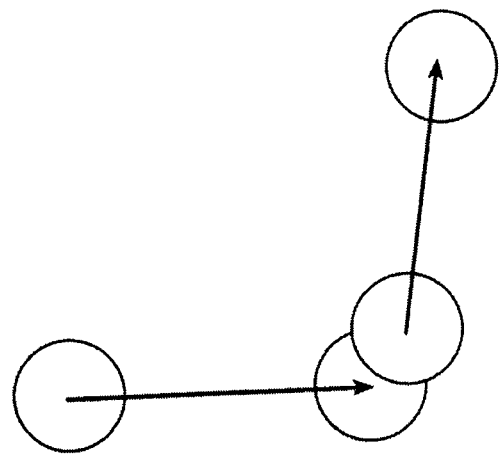
FIG. 2 is an example illustrating Gerber data.
Figure 3:
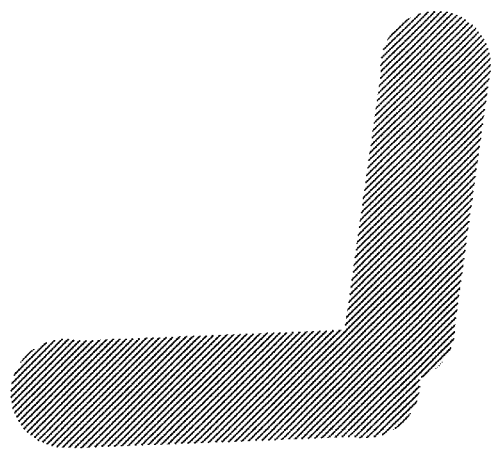
FIG. 3 is an example illustrating a filled diagram of a pattern image prepared from Gerber data.

The XY stage 2 is configured movable in XY directions (that is, in horizontal two axis directions), according to a control signal input from the controller 10. On the XY stage 2, a work is placed. The work, for example, is a plate-like body such as a printed-circuit board. On the work, a predetermined wiring pattern is formed. Here, the wiring pattern of the work is fabricated according to Gerber data. The Gerber data is a data file describing a wiring pattern shape for circuit board fabrication in Gerber data format. In this Gerber data, in addition to information providing an outline of a graphic similar to CAD (Computer Aided Design), information (closed area information) indicating an area of the wiring pattern is also included. FIG. 2 is an example of Gerber data indicating fabrication instructions for a wiring pattern of a circuit board. In the example of FIG. 2, with respect to a circular aperture, two trajectories are prepared. After known circuit board fabrication processes such as exposure and photo-etching are performed, as illustrated in FIG. 3, an area of a sum of the two trajectories of the aperture becomes a wiring pattern. In the present embodiment, when performing an edge detection process, the Gerber data is stored in a data memory 13 (to be described later).

The image capturer 3 includes a CCD camera and the like, and, for example, captures an image of a work placed on the XY stage 2 from above, according to a control signal input from the controller 10. The image capturer 3 includes, in addition to a lighting device and a focusing mechanism (not shown in the figure), a driving mechanism moving a location of the CCD camera in a Z axis direction (that is, a vertical direction).

Figure 5:
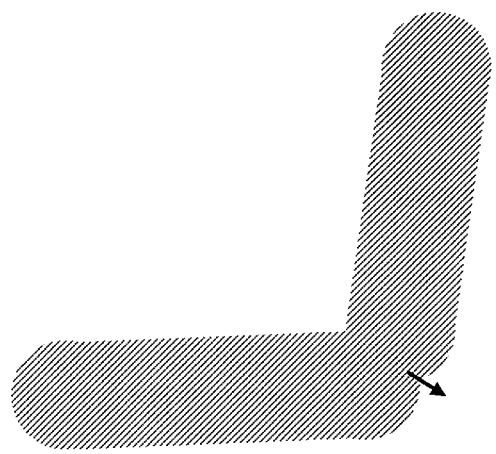
FIG. 5 is an example illustrating a state in which a detection tool is placed on the pattern image of FIG. 3.
Figure 4:
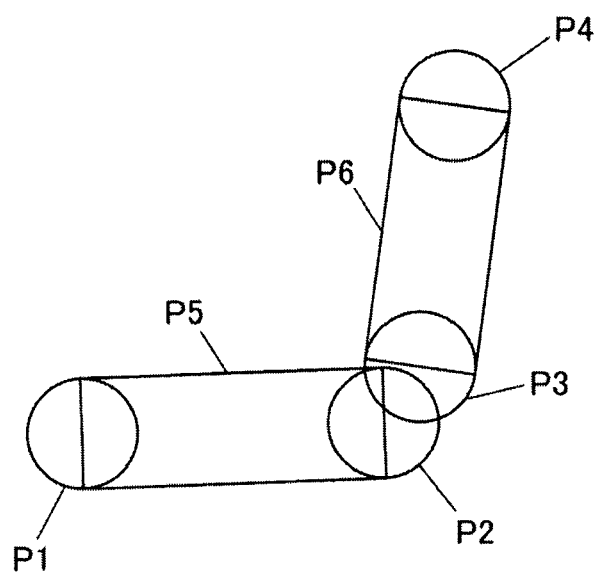
FIG. 4 is an example illustrating an outline diagram of a pattern image prepared from Gerber data.
Figure 6:
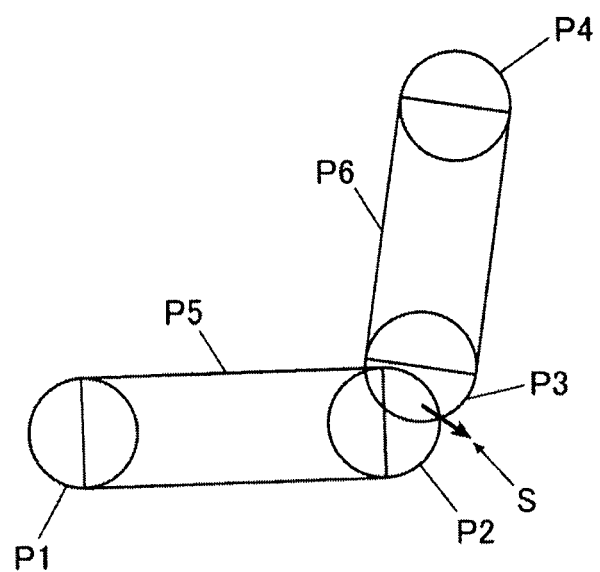
FIG. 6 is an example illustrating a state in which a detection tool is placed on the pattern image of FIG. 4.

The display 4 is, for example, a liquid crystal display panel, and displays various sorts of images, according to a control signal input from the controller 10. For example, on the display 4, a filled diagram (see FIG. 3) and an outline diagram (see FIG. 4) of a pattern image (an image illustrating a wiring pattern) based on the closed area information of the Gerber data are displayed. Further, on the display 4, as illustrated in FIG. 5 and FIG. 6, a detection tool (detection specification information) S is displayed, by superimposing on the pattern image. Here, the detection tool S is an arrow-shaped pointer for specifying a location of an edge to be detected in an image, a detection direction and a detection length. By using this detection tool S, a user can arbitrarily specify a location of an edge to be detected, a detection direction and a detection length.

The operator 5, for example, includes an operation key group such as a keyboard and a pointing device such as a mouse, and, when being operated by a user, outputs operation signals associated with the operation to the controller 10. The operator 5 is operated when a user performs a teaching operation (specifying a location of an edge to be detected, a detection direction and a detection length) and the like. And, when a teaching operation is performed by a user, the detection tool S is displayed on the display 4, by superimposing on the pattern image, as illustrated in FIG. 5 and FIG. 6.

The controller 10 is configured to have a CPU (Central Processing Unit) 11, a RAM (Random Access Memory) 12, the memory 13, and the like. The controller 10 is connected to the XY stage 2, the image capturer 3, the display 4, the operator 5, and the like, via a system bus and the like.

The CPU 21 performs various sorts of control operations, for example, according to various processing programs for an image measuring apparatus stored in the memory 13.

The RAM 12 includes, for example, a program storage area for deploying a processing program and the like to be executed by the CPU 21, and a data storage area for storing processing results and the like that occur when input data and a processing program are executed.

The memory 13 stores, for example, a system program executable in the image measuring apparatus 100, various processing programs executable by the system program, data used when the various processing programs are executed, data of results of various processes arithmetically processed by the CPU 21, and the like. A program is stored in the memory 13 in a form of computer-readable program code.

Specifically, the memory 13 stores, for example, a data memory 131, a data display program 132, a detection specification information display program 133, an image capturing program 134, an image memory 135, a graphic data preparation program 136, a search program 137, a judging program 138, a detection direction deciding program 139, a condition determination program 140, an edge detection program 141, and the like.

The data memory 131 stores, for example, Gerber data input by a user. This Gerber data, as described above, contains closed area information and the like of a work. Usually, the Gerber data is often possessed by a user together with the work as CAM (Computer Aided Manufacturing) data for circuit board fabrication. In the present embodiment, the Gerber data is stored in the data memory 131 by a user when performing an edge detection operation.

The data display program 132 is a program, for example, that causes the CPU 21 to display a pattern image on the display 4, based on the closed area information of Gerber data of a work stored in the data memory 131. Specifically, in response to a user operation on the operator 5, the CPU 21 executes the data display program 132, reads in the Gerber data stored in the data memory 131 and displays a pattern image on the display 4 (see FIG. 3 and FIG. 4). By executing such a data display program 132, the CPU 21 performs as a data displayer.

The detection specification information display program 133 is a program, for example, that causes the CPU 21 to display on the display 4 the detection tool S specifying a location of an edge to be detected, a detection direction and a detection length, by superimposing on the pattern image displayed on the display 4. Specifically, when a user performs an operation (a teaching operation) of the operator 5, the CPU 21 executes the detection specification information display program 133, and displays the detection tool S at the specified location with the specified direction and length (see FIG. 5 and FIG. 6). By executing such a detection specification information display program 133, the CPU 21 performs as a detection specification information displayer.

The image capturing program 134 is a program, for example, that causes the CPU 21 to capture an image of an area corresponding to the detection tool S of a work, when the detection tool S is displayed by the detection specification information display program 133 on the display 4, by superimposing on the pattern image. Specifically, the CPU 21 drives the XY stage 2 to move a work so that the location of the detection tool S of the work is at a center of an image capturing range. And, a CCD camera of the image capturer 3 captures an image of the work. When capturing an image, a location of the CCD camera of the image capturer 3 along the Z-axis direction is also adjusted so as to be in focus. By executing such a image capturing program 134, the CPU 21, together with the image capturer 3, performs as an image capturer.

The image memory 135 stores image data and the like of an image of a work, captured by the image capturer 3. Specifically, image information input from the CCD camera of the image capturer 3 is stored in the image memory 135 via an interface (not shown in the figure).

The graphic data preparation program 136 is a program, for example, that causes the CPU 21 to prepare, from Gerber data, one graphic data or a plurality of graphic data indicating a closed area of a pattern image. Specifically, when a graphic of a predetermined shape such as a circle or a square applies to a closed area of a pattern image, the CPU 21 determines as graphic data a graphic necessary for forming an outline of the closed area (see FIG. 6). In the example of FIG. 6, the graphic data is made up of 6 graphics including 4 circles P1-P4 and 2 rectangles P5 and P6. By executing such a graphic data preparation program 136, the CPU 21 performs as a graphic data preparer.

The search program 137 is a program, for example, that causes the CPU 21 to search for, from the graphic data prepared by executing the graphic data preparation program 136, a graphic having an intersection point with the detection tool S. Specifically, the CPU 21 searches for, from the acquired graphic data, a graphic having a side intersecting the detection tool S. By executing such a search program 137, the CPU 21 performs as a searcher.

The judging program 138 is a program, for example, that causes the CPU 21 to judge whether a graphic having an intersection point with the detection tool S is found by executing the search program 137. Specifically, the CPU 21 judges whether, among the prepared graphic data, there was a graphic having a side intersecting the detection tool S (whether a graphic that meets the condition is found). For example, in the example of FIG. 6, the CPU 21 judges that, for example, the circle P2 is a graphic that meets the condition. When a graphic that meets the condition is not found, an edge (boundary of a wiring pattern) does not exist within a line segment of the detection tool S. Therefore, the CPU 21 judges that a placement location or a size of the detection tool S is improper, and displays an error message. By executing such a judging program 138, the CPU 21 performs as a judge section (also referred to as a judger).

Figure 7A:
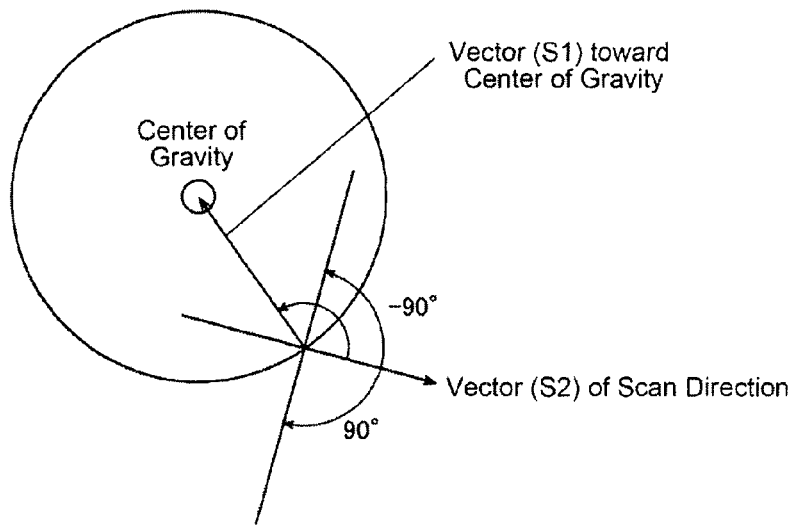
FIG. 7 is diagram for explaining with respect to deciding a scan direction of a detection tool.
Figure 7B:
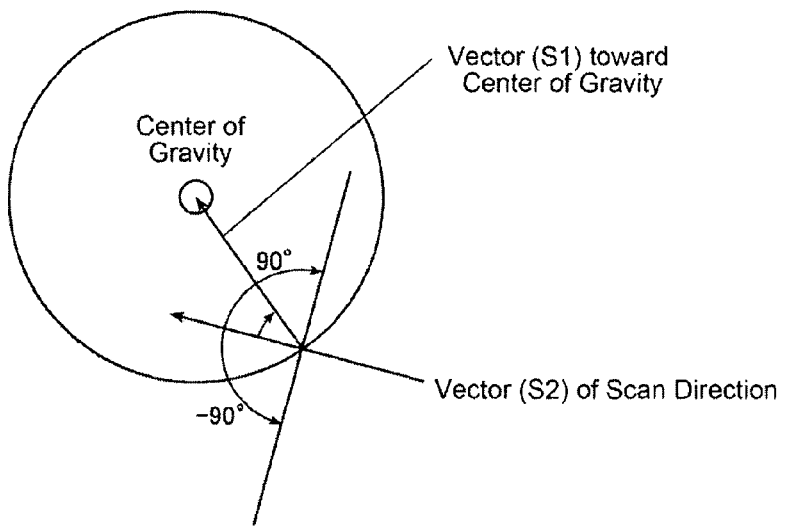

The detection direction deciding program 139 is a program, for example, that causes the CPU 21 to detect, when it is judged by executing the judging program 138 that a graphic having an intersection point with the detection tool S is found, whether the detection direction of the detection tool S is toward inside or outside with respect to the graphic, based on an angle formed by a vector (S1) toward a center of gravity of the graphic from a location of an edge to be detected and a vector (S2) of the detection direction of the detection tool S. Specifically, the CPU 21 judges that the detection direction of the detection tool S is toward inside with respect to the graphic when the vector (S1) is within a 90°--90° range with respect to the vector (S2) (see FIG. 7(b)). On the other hand, the CPU 21 judges that the detection direction of the detection tool S is toward outside with respect to the graphic when the vector (S1) is outside the 90°--90° range with respect to the vector (S2) (see FIG. 7(a)). Therefore, for example, in the example of FIG. 6, it is judged that the detection direction of the detection tool S is toward outside with respect to the graphic. By executing such a detection direction deciding program 139, the CPU 21 performs as a scan direction decider.

The condition determination program 140 is a program, for example, that causes the CPU 21 to detect a "light-dark change condition" indicating whether an image is changing from a light section to a dark section or from a dark section to a light section along a detection direction, when performing an edge detection by the edge detection program 141 to be described later. Specifically, according to a result of deciding by executing the detection direction deciding program 139, the CPU 21 determines the light-dark change condition as that the image changes from a light section to a dark section when the detection direction of the detection tool S is toward inside with respect to the graphic, and determines the light-dark change condition as that the image changes from a dark section to a light section when the detection direction of the detection tool S is toward outside with respect to the graphic. Therefore, for example, in the example of FIG. 6, the light-dark change condition is determined as that the image changes from a dark section to a light section. By executing such a condition determination program 140, the CPU 21 performs as a condition determiner.

The edge detection program 141 is a program, for example, that causes the CPU 21 to perform an edge detection of a location of an edge to be detected with respect to data of an image captured by the image capturer 3 by executing the image capturing program 134, according to the detection direction and the detection length specified by the detection tool S. Specifically, the CPU 21 performs a scan along a direction (detection direction) of an arrow of the detection tool S to detect a location of an edge. In doing so, the light-dark change condition obtained by executing the condition determination program 140 is used as light-dark change parameter. By executing such an edge detection program 141, the CPU 21 performs as an edge detector.

Figure 8:
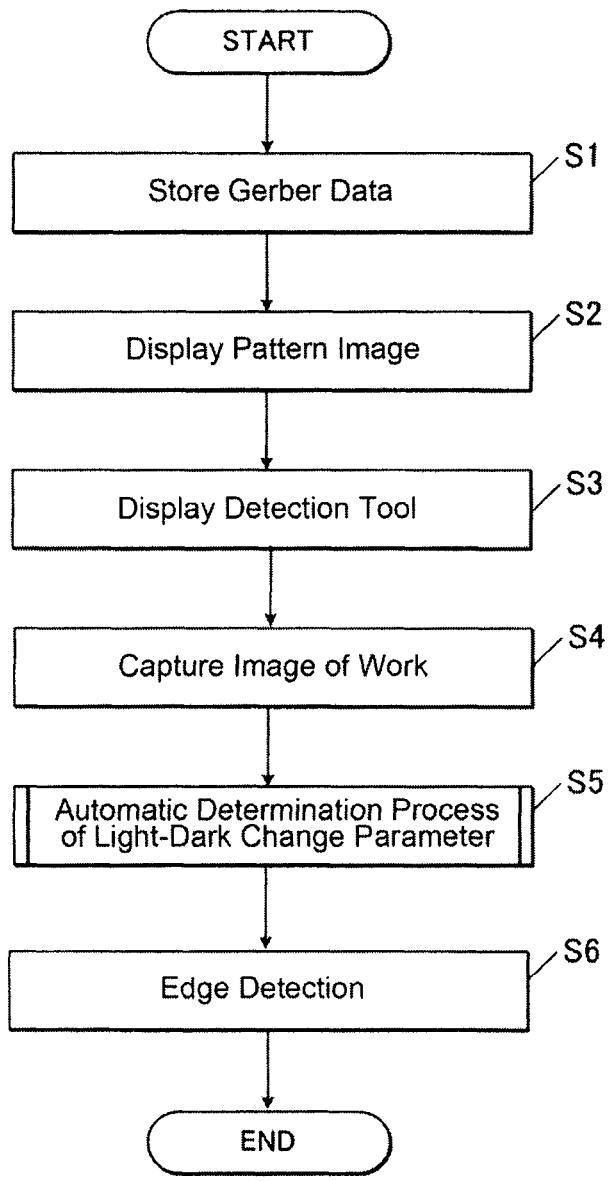
FIG. 8 is a flowchart illustrating an edge detection process in the image measuring apparatus of FIG. 1.

Next, an edge detection process of the image measuring apparatus 100 is explained using a flowchart of FIG. 8. First, at step S1, a user stores, in the data memory 131, Gerber data of a work (a printed-circuit board) to be measured by using the image measuring apparatus 100 (storage process). Next, at step S2, the CPU 21 displays on the display 4 a pattern image (see FIG. 3 and FIG. 4) (display process). Next, at step S3, in response to a placement operation of the detection tool S on the pattern image by a user, the CPU 21 displays on the display 4 the detection tool S, by superimposing on the pattern image (see FIG. 5 and FIG. 6) (detection specification information display process). Next, at step S4, the CPU 21 moves the XY stage 2 that carries the work so that the location of the detection tool S of the work is at a center of an image capturing range, and performs image capturing by using the image capturer 3 (image capture process). Next, at step S5, the CPU 21, when performing an edge detection around the location of the detection tool S in the captured image data, determines a light-dark change condition at an edge section (automatic determination process of light-dark change parameter) (condition determination process). Next, at step S6, the CPU 21 performs an edge detection (edge detection process), and terminates the present processing.

Figure 9:
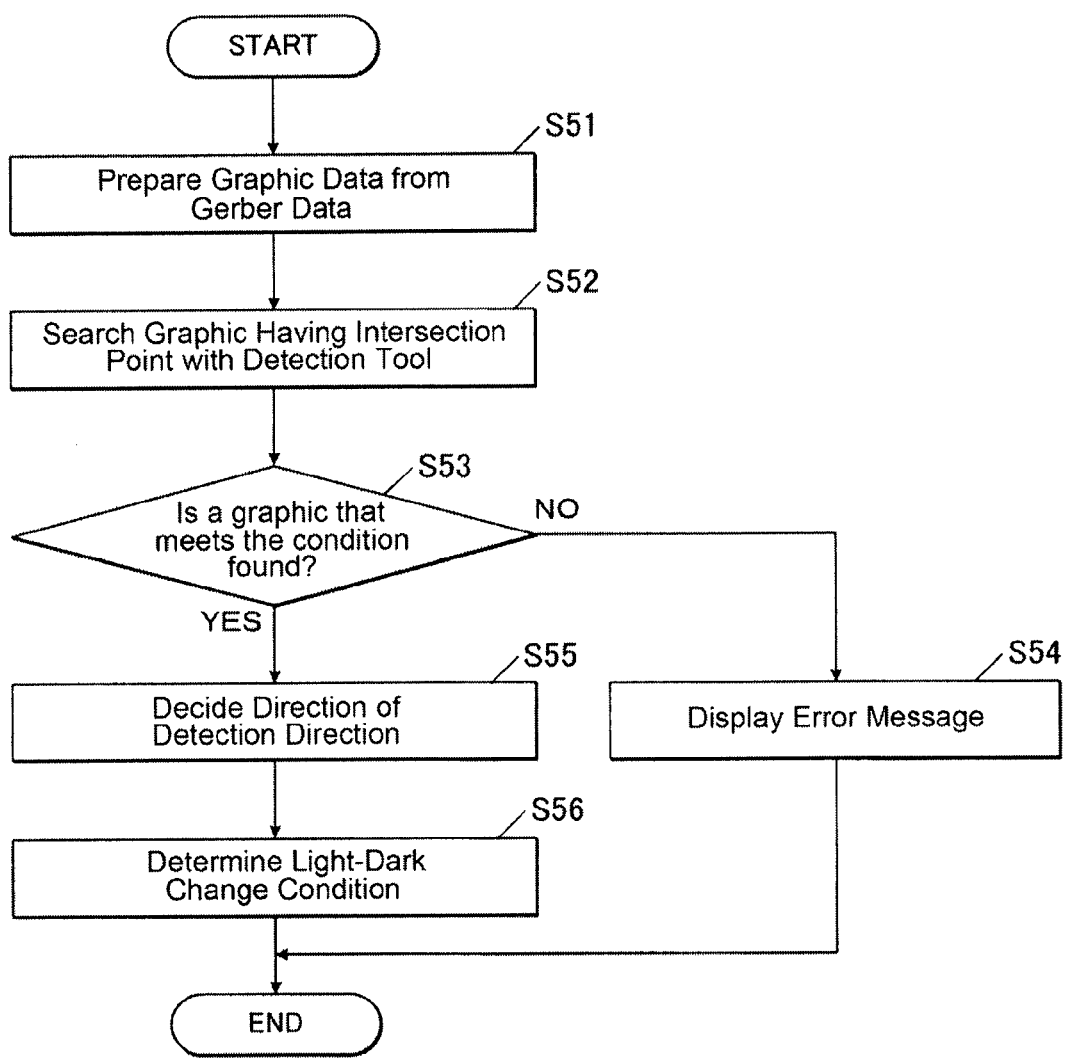
FIG. 9 is a flowchart illustrating an automatic determination process of a light-dark change parameter of FIG. 8.

Next, the automatic determination process of a light-dark change parameter at the step S5 in FIG. 8 is explained using a flowchart of FIG. 9. First, at step S51, the CPU 21 prepares, from Gerber data, graphic data indicating a closed area (see FIG. 6). Next, at step S52, the CPU 21 searches for, from the graphic data, a graphic having an intersection point with the detection tool S. Next, at step S53, the CPU 21 judges whether a graphic that meets the condition (a graphic that has an intersection point with the detection tool S) is found. When a graphic that meets the condition is not found (step S53: NO), at a continuing step S54, the CPU 21 displays an error message, and terminates the present processing. On the other hand, when a graphic that meets the condition is found (step S53: YES), at a continuing step S55, the CPU 21 decides a direction of a detection direction of the detection tool S, that is, whether the detection tool S is toward inside or outside with respect to the graphic. Next, at step S56, the CPU 21 determines a light-dark change condition as changing from light to dark when the detection direction is toward inside of the graphic, and determines the light-dark change condition as changing from dark to light when the detection direction is toward outside of the graphic, and terminates the present processing.

As described above, according to the present embodiment, when performing an edge detection, a light-dark change condition indicating whether an image is changing from a light section to a dark section or from a dark section to a light section along a detection direction is automatically determined by using Gerber data. For this reason, a user is not required to consider a light-dark change condition with respect to a location of an edge to be detected. Therefore, workload of a teaching work is reduced, working time is shortened, and usability is improved. Further, the light-dark change condition is automatically determined. Therefore, setting mistakes are prevented, and reliability of a measurement is improved.

Second Embodiment

Figure 10:
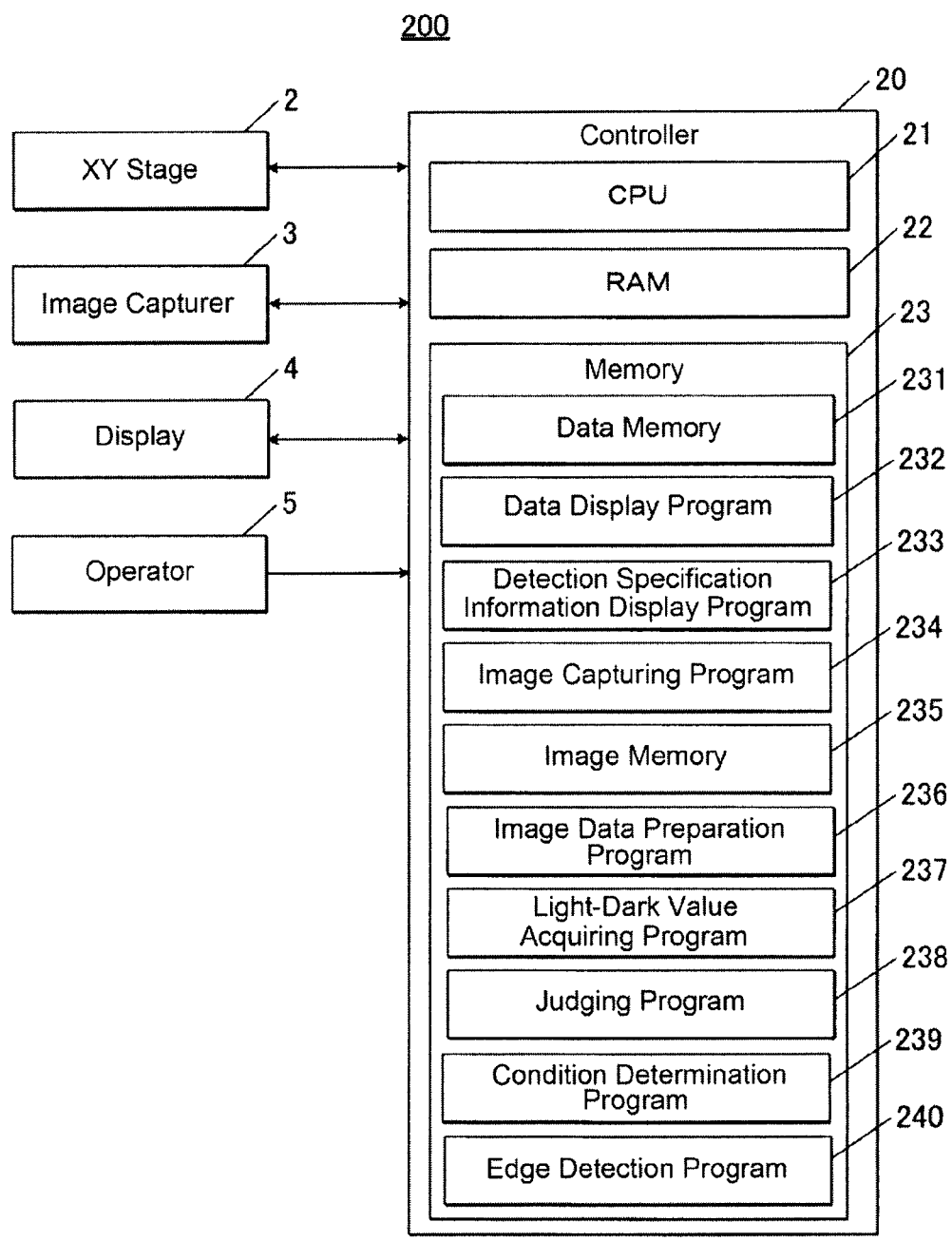
FIG. 10 is a block diagram illustrating an overall configuration of an image measuring apparatus of a second embodiment.

Next, a second embodiment of the present invention is explained. An automatic determination process of a light-dark parameter in an image measuring apparatus 200 of the present embodiment is different from that in the first embodiment. Therefore, this point is primarily explained. Components that are the same as in the first embodiment are assigned the same numerical references, and explanation thereof is omitted. Specifically, as illustrated in FIG. 10, the image measuring apparatus 200 includes the XY stage 2, the image capturer 3, the display 4, the operator 5, a controller 20, and the like.

In the present embodiment, when performing the automatic determination process of the light-dark change parameter and when preparing digitized image data of a filled image of a pattern image, the operator 5 is used to set a resolution of the image data. In doing so, it is desirable that the setting of the resolution is performed by using, as a guide, a resolution in which each pixel is about, for example, 1/10 of the size of the placed detection tool S. Here, increasing the resolution of digitization to make pixels smaller reduces processing errors, but increases processing time. Here, by considering these trade-offs, a suitable resolution is selected. As just described, the operator 5 performs as a resolution setter setting a resolution of digitized image data of a pattern image.

The controller 20 is configured to have a CPU 21, a RAM 22, a memory 23, and the like.

The CPU 21 performs various sorts of control operations, for example, according to various processing programs for an image measuring apparatus stored in the memory 23.

The RAM 22 includes, for example, a program storage area for deploying a processing program and the like to be executed by the CPU 21, and a data storage area for storing processing results and the like that occur when input data and a processing program are executed.

The memory 23 stores, for example, a system program executable in the image measuring apparatus 200; various processing programs executable by the system program; data used when the various processing programs are executed; data of results of various processes arithmetically processed by the CPU 21; and the like. A program is stored in the memory 23 in a form of computer-readable program code.

Specifically, the memory 23 stores, for example, a data memory 231, a data display program 232, a detection specification information display program 233, an image capturing program 234, an image memory 235, an image data preparation program 236, a light-dark value acquiring program 237, a judging program 238, a condition determination program 239, an edge detection program 240, and the like.

The data memory 231, the data display program 232, the detection specification information display program 233, the image capturing program 234, the image memory 235, and the edge detection program 240 are, respectively, the same programs as the data memory 131, the data display program 132, the detection specification information display program 133, the image capturing program 134, the image memory 135, and the edge detection program 141 in the first embodiment. Therefore, detailed explanation thereof is omitted.

Figure 11:
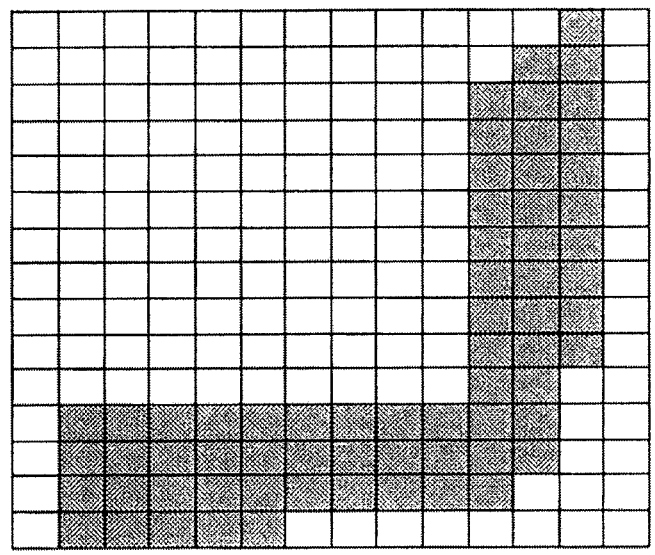
FIG. 11($a$) is an example illustrating digitized image data of a pattern image of a low resolution.
Figure 11:
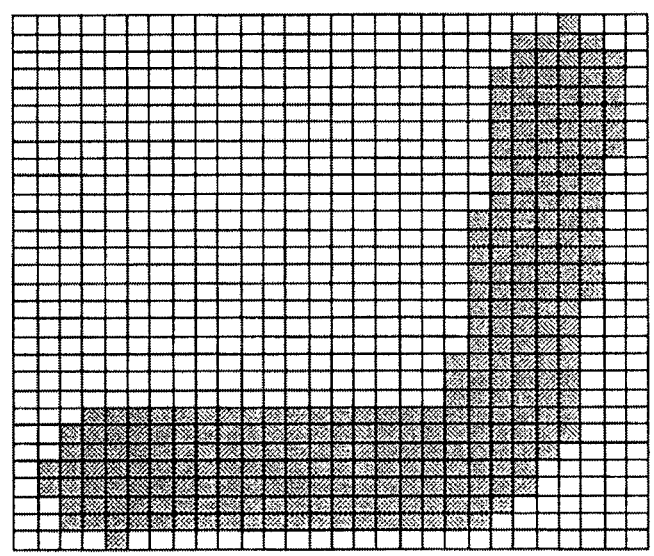

The image data preparation program 236 is a program, for example, that causes the CPU 21 to prepare image data of a pattern image with a resolution set by using the operator 5. Specifically, the CPU 21 considers each digitized pixel as a rectangle, judges an area of a pixel as black when a filled area therein is ½ or more and as white when the filled area is under ½, and prepares image data of an image as illustrated in FIG. 11(a) and FIG. 11(b). FIG. 11(a) illustrates image data of a low resolution, and FIG. 11(b) illustrates image data of a high resolution. By executing such an image data preparation program 236, the CPU 21 performs as an image data preparer.

Figure 12A:
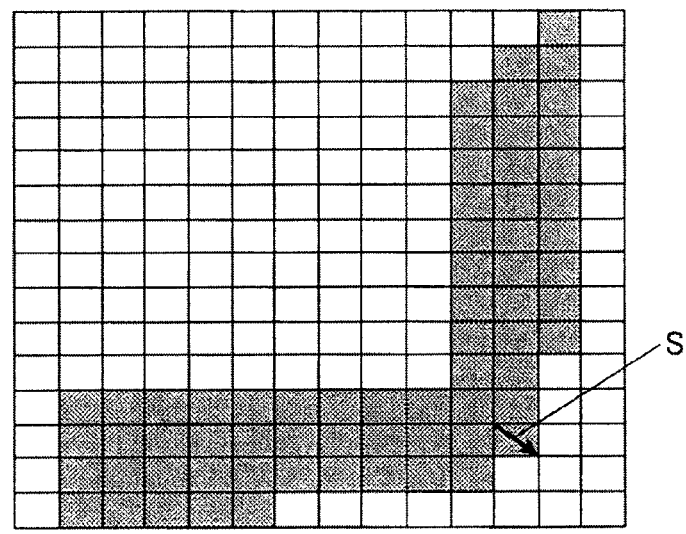
FIG. 12($a$) is an example illustrating the image data of a low resolution of FIG. 11($a$) and a detection tool.
Figure 12B:
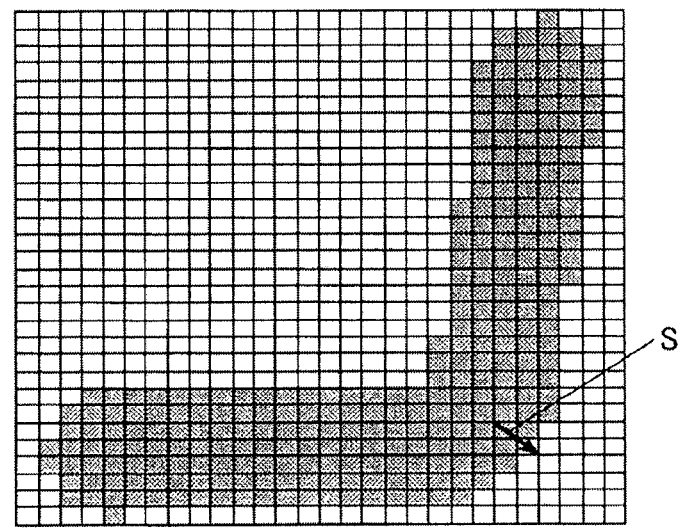

The light-dark value acquiring program 237 is a program, for example, that causes the CPU 21 to acquire light-dark values of pixels located at a starting point and an ending point of the detection tool S in image data prepared by executing the image data preparation program 236. Specifically, by using a fore-end and a back-end of the detection tool S as the starting point and the ending point, respectively, the CPU 21 judges whether the pixels located at the fore-end and the back-end are black or white. For example, in the example of FIG. 12(a), the pixels located at the fore-end and the back-end of the detection tool S are both black. On the other hand, in the example of FIG. 12(b), the pixel located at the back-end of the detection tool S is black, and the pixel located at the fore-end is white. By executing such a light-dark value acquiring program 237, the CPU 21 performs as a light-dark value acquirer.

The judging program 238 is a program that causes the CPU 21 to judge whether the light-dark values of the pixels acquired by executing the light-dark value acquiring program 237 are different. Specifically, by comparing the light-dark values (black or white) of the pixels located at the fore-end and the back-end of the detection tool S, the CPU 21 judges whether the two are different. For example, in the case of a low resolution of FIG. 12(a), the pixels located at the fore-end and the back-end are both black. Therefore, it is judged that the light-dark values of the pixels are the same. On the other hand, in the case of a high resolution of FIG. 12(b), the pixel located at the back-end is black and the pixel located at the fore-end is white. Therefore, it is judged that the light-dark values of the pixels are different. When the light-dark values of the two pixels are the same (see FIG. 12(a)), the CPU 21 judges that the placement location or the size of the detection tool S is improper, and displays an error message. By executing such a judging program 238, the CPU 21 performs as a judge section.

The condition determination program 239 is a program that causes the CPU 21 to determine a "light-dark change condition" indicating whether an image is changing from a light section to a dark section or from a dark section to a light section along a detection direction, when performing an edge detection by the edge detection program 240. Specifically, in a case where it is judged, by executing the judging program 238, that the light-dark values (black or white) of the pixels are different, the CPU 21 determines the light-dark change condition as that the image changes from a light section to a dark section when the starting point is lighter than the ending point, and determines the light-dark change condition as that the image changes from a dark section to a light section when the starting point is darker than the ending point. For example, in the example of FIG. 12(b), the light-dark change condition is determined as that the image changes from a dark section to a light section. By executing such a condition determination program 239, the CPU 21 performs as a condition determiner.

Figure 13:
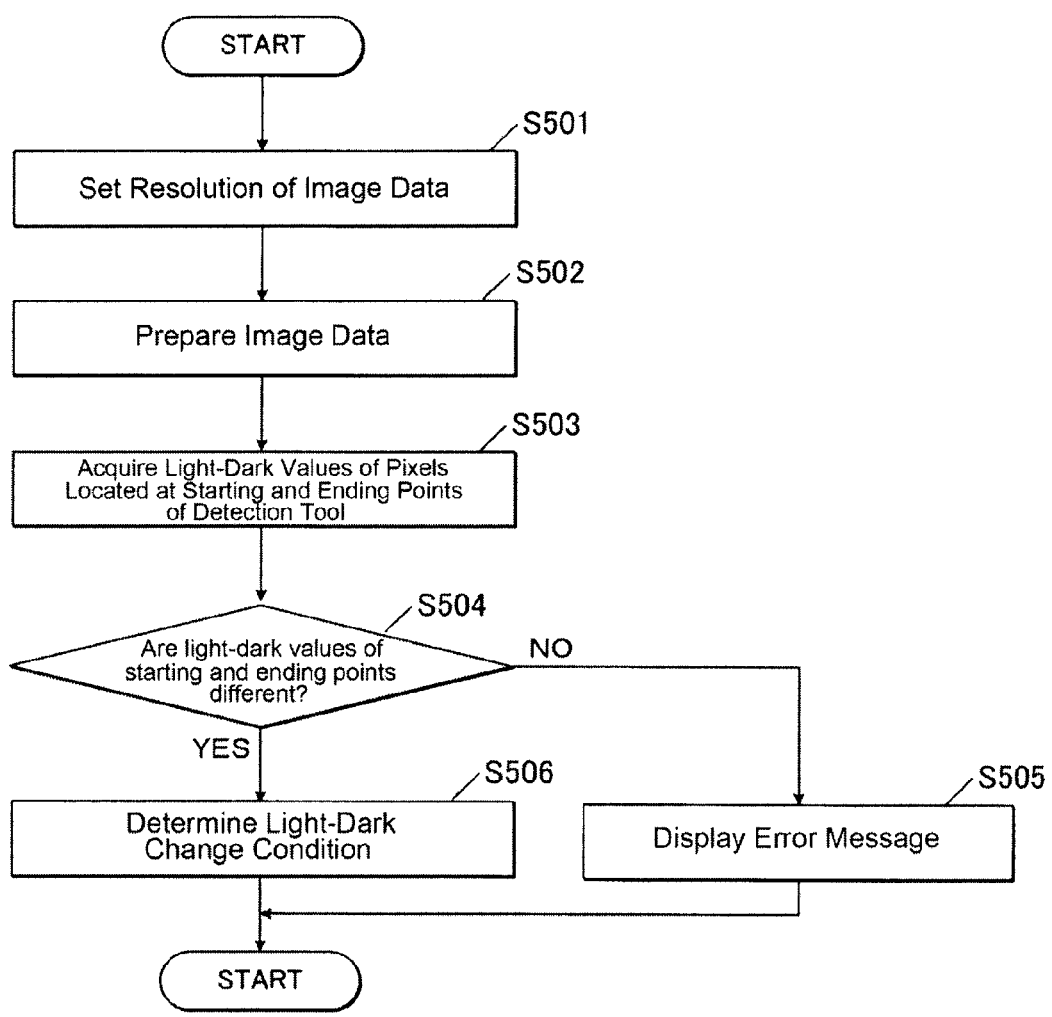
FIG. 13 is a flowchart illustrating an automatic determination process of a light-dark change parameter in the second embodiment.

Next, the automatic determination process of a light-dark change parameter according to the image measuring apparatus 200 of the present embodiment is explained using a flowchart of FIG. 13. First, at step S501, a user sets a resolution of prepared image data. Next, at step S502, the CPU 21 prepares image data using the set resolution. Next, at step S503, the CPU 21 acquires light-dark values of pixels located at a starting point and an ending point of the detection tool S. Next, at step S504, the CPU 21 judges whether the light-dark values of the pixels located at the starting and ending points of the detection tool S are different. When the light-dark values are not different (step S504: NO), at a continuing step S505, the CPU 21 displays an error message, and terminates the present processing. On the other hand, when the light-dark values are different (step S504: YES), at a continuing step S506, the CPU 21 determines the light-dark change condition as that the image changes from a light section to a dark section when the starting point is lighter than the ending point, and determines the light-dark change condition as that the image changes from a dark section to a light section when the starting point is darker than the ending point, and terminates the present processing.

As described above, according to the present embodiment, when performing an edge detection, a light-dark change condition indicating whether an image is changing from a light section to a dark section or from a dark section to a light section along a detection direction is automatically determined by using Gerber data. For this reason, a user is not required to consider a light-dark change condition with respect to a location of an edge to be detected. Therefore, workload of a teaching work is reduced, working time is shortened, and usability is improved. Further, the light-dark change condition is automatically determined. Therefore, setting mistakes are prevented, and reliability of a measurement is improved.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An image measuring apparatus comprising:
  a data memory configured to store Gerber data containing closed area information of a measured object;
  a display configured to display a pattern image based on the closed area information of the Gerber data;
  an inputter that receives an input of a location of an edge to be detected, a detection direction and a detection length;
  a detection specification information displayer configured to display, on the display, detection specification information specifying the location of the edge to be detected, the detection direction and the detection length, by superimposing the detection specification information on the pattern image displayed on the display;
  an image capturer configured to capture an image of an area corresponding to the detection specification information of the measured object, when the detection specification information is displayed on the display by the detection specification information displayer, by superimposing the detection specification information on the pattern image;
  an edge detector configured to perform an edge detection of the location of the edge to be detected, with respect to data of the image captured by the image capturer, according to the detection direction and the detection length specified by the detection specification information, and according to a light-dark change parameter; and
  a condition determiner configured to determine, by using the Gerber data, a light-dark change condition indicating whether the image changes from a light section to a dark section or from a dark section to a light section along the detection direction based upon the detection direction of the detection specification information, before the edge detector performs the edge detection,
  wherein the edge detector performs the edge detection using the light-dark change condition determined by the condition determiner, as the light-dark change parameter.

2. The image measuring apparatus according to claim 1, comprising:
  a graphic data preparer configured to prepare, from the Gerber data, at least one of one graphic data and a plurality of graphic data, corresponding to an outline of a closed area of the pattern image;
  a searcher configured to search, from among the graphic data prepared by the graphic data preparer, a graphic having an intersection point with the detection specification information;
  a judger configured to judge whether a graphic having an intersection point with the detection specification information is found by the searcher; and
  a detection direction decider configured to decide, when it is judged by the judger that a graphic having an intersection point with the detection specification information is found, whether the detection direction of the detection specification information is toward inside or outside with respect to the graphic, based on an angle formed by a vector directed toward a center of gravity of the graphic from the location of the edge to be detected and a vector of the detection direction of the detection specification information, wherein,
  according to a result of deciding by the detection direction decider, the condition determiner determines the light-dark change condition as that the image changes from a light section to a dark section when the detection direction of the detection specification information is toward inside with respect to the graphic, and determines the light-dark change condition as that the image changes from a dark section to a light section when the detection direction of the detection specification information is toward outside with respect to the graphic.

3. The image measuring apparatus according to claim 1, comprising:
- a resolution setter configured to set resolution of digitized image data of the pattern image;
- an image data preparer configured to prepare the image data of the pattern image with the resolution set by the resolution setter;
- a light-dark value acquirer configured to acquire light-dark values of pixels located at a starting point and an ending point of the detection specification information in the image data prepared by the image data preparer; and
- a judger configured to judge whether the light-dark values of the pixels acquired by the light-dark value acquirer are different, wherein,
- the condition determiner, in a case where it is judged by the judger that the light-dark values of the pixels are different, determines the light-dark change condition as that the image changes from a light section to a dark section when the starting point is brighter than the ending point, and determines the light-dark change condition as that the image changes from a dark section to a light section when the starting point is darker than the ending point.

4. A computer program stored in a non-transitory computer-readable medium, for causing a computer to perform as:
- a data displayer configured to display, on a display, a pattern image, based on closed area information of Gerber data of a measured object stored in a data memory;
- an inputter that receives an input of a location of an edge to be detected a detection direction and a detection length;
- a detection specification information displayer configured to display, on the display, detection specification information specifying the location of the edge to be detected, the detection direction and the detection length, by superimposing the detection specification information on the pattern image displayed on the display;
- an image capturer configured to capture an image of an area corresponding to the detection specification information of the measured object, when the detection specification information is displayed on the display by the detection specification information displayer, by superimposing the detection specification information on the pattern image;
- an edge detector configured to perform an edge detection of the location of the edge to be detected, with respect to data of the image captured by the image capturer, according to the detection direction and the detection length specified by the detection specification information, and according to a light-dark change parameter; and
- a condition determiner configured to determine, by using the Gerber data, a light-dark change condition indicating whether the image changes from a light section to a dark section or from a dark section to a light section along the detection direction based upon the detection direction of the detection specification information, before the edge detector performs the edge detection,
- wherein the edge detector performs the edge detection using the light-dark change condition determined by the condition determiner, as the light-dark change parameter.

5. A teaching method of an image measuring apparatus comprising:
- storing, in a data memory, Gerber data containing closed area information of a measured object;
- displaying, on a display, a pattern image based on the closed area information of the Gerber data;
- receiving an input of a location of an edge to be detected a detection direction and a detection length;
- displaying, on the display, detection specification information specifying the location of the edge to be detected, the detection direction and the detection length, by superimposing the detection specification information on the pattern image displayed on the display;
- capturing an image of an area corresponding to the detection specification information of the measured object, when the detection specification information is displayed on the display by said displaying, on the display, detection specification information, by superimposing the detection specification information on the pattern image;
- performing an edge detection of the location of the edge to be detected, with respect to data of the captured image, according to the detection direction and the detection length specified by the detection specification information, and according to a light-dark change parameter; and
- determining, by using the Gerber data, a light-dark change condition indicating whether the image changes from a light section to a dark section or from a dark section to a light section along the detection direction based upon the detection direction of the detection specification information, before the edge detection is performed,
- wherein in performing the edge detection, the determined light-dark change condition is used as the light-dark change parameter.

* * * * *

UNITED STATES PATENT AND TRADEMARK OFFICE
CERTIFICATE OF CORRECTION

PATENT NO. : 8,538,165 B2  
APPLICATION NO. : 13/091350  
DATED : September 17, 2013  
INVENTOR(S) : T. Kojima et al.

Page 1 of 1

It is certified that error appears in the above-identified patent and that said Letters Patent is hereby corrected as shown below:

In the Claims

At column 13, line 33 (claim 4, line 8) of the printed patent, "detected a" should read -- detected, a --.

At column 14, line 20 (claim 5, line 7) of the printed patent, "detected a" should read -- detected, a --.

Signed and Sealed this  
Twenty-fifth Day of February, 2014

Michelle K. Lee  
*Deputy Director of the United States Patent and Trademark Office*